(12) United States Patent
Wang

(10) Patent No.: US 12,540,032 B2
(45) Date of Patent: Feb. 3, 2026

(54) METHOD AND APPARATUS FOR DETERMINING POSITION OF RACK

(71) Applicant: Beijing Jingdong Qianshi Technology Co., Ltd., Beijing (CN)

(72) Inventor: Peng Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 489 days.

(21) Appl. No.: 18/010,185

(22) PCT Filed: Apr. 22, 2021

(86) PCT No.: PCT/CN2021/088890
§ 371 (c)(1),
(2) Date: May 1, 2023

(87) PCT Pub. No.: WO2022/033070
PCT Pub. Date: Feb. 17, 2022

(65) Prior Publication Data
US 2024/0294336 A1    Sep. 5, 2024

(30) Foreign Application Priority Data
Aug. 13, 2020 (CN) .......................... 202010812707.8

(51) Int. Cl.
*B65G 1/04* (2006.01)
*B65G 1/137* (2006.01)
(Continued)

(52) U.S. Cl.
CPC ......... *B65G 1/0492* (2013.01); *B65G 1/1371* (2013.01); *G05D 1/2446* (2024.01);
(Continued)

(58) Field of Classification Search
CPC .. B65G 1/0492; B65G 1/1371; G05D 1/2446; G05D 1/2462; G05D 1/6987;
(Continued)

(56) References Cited

U.S. PATENT DOCUMENTS 7,826,919 B2    11/2010   D'Andrea et al.
9,908,239 B1 *   3/2018   O'Brien .................. B25J 5/007
(Continued)

FOREIGN PATENT DOCUMENTS

CN    104036212 A    9/2014
CN    104036223 A    9/2014
(Continued)

OTHER PUBLICATIONS

European Application No. 21855126.5 Office Action dated Sep. 18, 2025.

*Primary Examiner* — Thomas Randazzo
(74) *Attorney, Agent, or Firm* — Venable LLP; Ryan T. Ward

(57) ABSTRACT

A method and an apparatus for determining a position of a shelf are provided. The method may include: obtaining a number of automated guided vehicles with shelf scanning devices; determining, based on the number of the automated guided vehicles, a scanning area of a place to which each automated guided vehicle belongs; determining, based on the scanning area, a scanning route of the scanning area to which each automated guided vehicle belongs; transmitting the scanning route of the scanning area to which the automated guided vehicle belongs, to the automated guided vehicle; and determining a position of a shelf in the scanning area to which the automated guided vehicle belongs based on scanning information of a shelf scanning device on the automated guided vehicle and position information of the automated guided vehicle.

17 Claims, 8 Drawing Sheets

(51) Int. Cl.
  *G05D 1/244* (2024.01)
  *G05D 1/246* (2024.01)
  *G05D 1/698* (2024.01)
  *G05D 101/00* (2024.01)
  *G05D 101/20* (2024.01)
  *G05D 107/70* (2024.01)

(52) U.S. Cl.
  CPC ......... *G05D 1/2462* (2024.01); *G05D 1/6987* (2024.01); *G05D 2101/20* (2024.01); *G05D 2101/22* (2024.01); *G05D 2107/70* (2024.01)

(58) Field of Classification Search
  CPC ........... G05D 2101/20; G05D 2101/22; G05D 2107/70; G05D 1/0274
  See application file for complete search history.

(56) References Cited

U.S. PATENT DOCUMENTS

| | | | |
|---|---|---|---|
| 2014/0277691 A1 | 9/2014 | Jacobus et al. | |
| 2016/0121913 A1 | 5/2016 | Lim et al. | |
| 2018/0108134 A1* | 4/2018 | Venable | G06T 7/521 |
| 2020/0026304 A1 | 1/2020 | Thode et al. | |
| 2021/0200232 A1* | 7/2021 | Kwak | G05D 1/0251 |

FOREIGN PATENT DOCUMENTS

| | | | | |
|---|---|---|---|---|
| CN | 104732606 A | | 6/2015 | |
| CN | 205397170 U | | 7/2016 | |
| CN | 107092263 A | | 8/2017 | |
| CN | 107239921 A | | 10/2017 | |
| CN | 107705059 A | | 2/2018 | |
| CN | 108469830 A | | 8/2018 | |
| CN | 108596530 A | | 9/2018 | |
| CN | 108762277 A | | 11/2018 | |
| CN | 110182527 A | | 8/2019 | |
| CN | 110533353 A | | 12/2019 | |
| CN | 110689095 A | | 1/2020 | |
| CN | 110794846 A | | 2/2020 | |
| CN | 111027912 A | * | 4/2020 | ........... G06Q 10/083 |
| CN | 111415110 A | | 7/2020 | |
| CN | 112327824 A | | 2/2021 | |
| DE | 102014111385 A1 | | 2/2016 | |
| EP | 3290962 A1 | | 3/2018 | |
| JP | 2018-513822 A | | 5/2018 | |
| JP | 2018-150124 A | | 9/2018 | |
| JP | 2019-189380 A | | 10/2019 | |
| JP | 2023527210 A | * | 6/2023 | ........... B65G 1/0492 |
| KR | 20240110674 A | * | 7/2024 | ............ G01S 17/86 |
| WO | 2015/059740 A1 | | 4/2015 | |
| WO | 2016125001 A1 | | 8/2016 | |

* cited by examiner

METHOD AND APPARATUS FOR DETERMINING POSITION OF RACK

CROSS-REFERENCE TO RELATED APPLICATIONS

The present application is a national stage of International Application No. PCT/CN2021/088890, filed on Apr. 22, 2021, which claims the priority of Chinese Patent Application No. 202010812707.8, filed on Aug. 13, 2020, titled "Method and Apparatus for Determining Position of Shelf", Applicant of which is Beijing Jingdong Qianshi Technology Co., Ltd. Both of the aforementioned applications are hereby incorporated by reference in their entireties.

TECHNICAL FIELD

The present disclosure relates to the field of computer technology, in particular to the field of warehousing technology, the field of AGV route planning technology, and more particularly, to a method and an apparatus for determining a position of a shelf, an electronic device, and a computer readable medium.

BACKGROUND

An Automated Guided Vehicle (AGV), also commonly known as an AGV trolley, is a transport vehicle equipped with an navigation such an automatic device as electromagnetic or optical device, capable of traveling along a predetermined navigation route, and having safety protection functions and various transport functions.

Before an unmanned warehouse opens, it is necessary to first place an empty shelf at an entrance through the AGV vehicle, and then transport the empty shelf from the entrance to a corresponding storage position in the warehouse. Before the empty shelf is transported from the entrance to the storage position, it is necessary to manually bind a shelf number and the storage position together.

SUMMARY

Embodiments of the present disclosure provide a method and an apparatus for determining a position of a shelf.

In a first aspect, an embodiment of the present disclosure provides a method for determining a position of a shelf. The method may include: obtaining a number of automated guided vehicles with shelf scanning devices; determining, based on the number of the automated guided vehicles, a scanning area of a place to which each automated guided vehicle belongs; determining, based on the scanning area, a scanning route of the scanning area to which each automated guided vehicle belongs; transmitting the scanning route of the scanning area to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; and determining a position of a shelf in the scanning area to which the automated guided vehicle belongs based on scanning information of a shelf scanning device on the automated guided vehicle and position information of the automated guided vehicle.

In a second aspect, an embodiment of the present disclosure provides an apparatus including one or more processors; a storage apparatus on which one or more programs are stored; when one or more programs are executed by one or more processors, one or more processors are caused to implement the method as described in any of the implementations of the first aspect.

In a third aspect, embodiments of the present disclosure provide a non-transitory computer readable storage medium storing computer instructions, where the computer instructions when executed by a computer cause the computer to perform the method as described in any of the implementations of the first aspect.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

Figure 1:
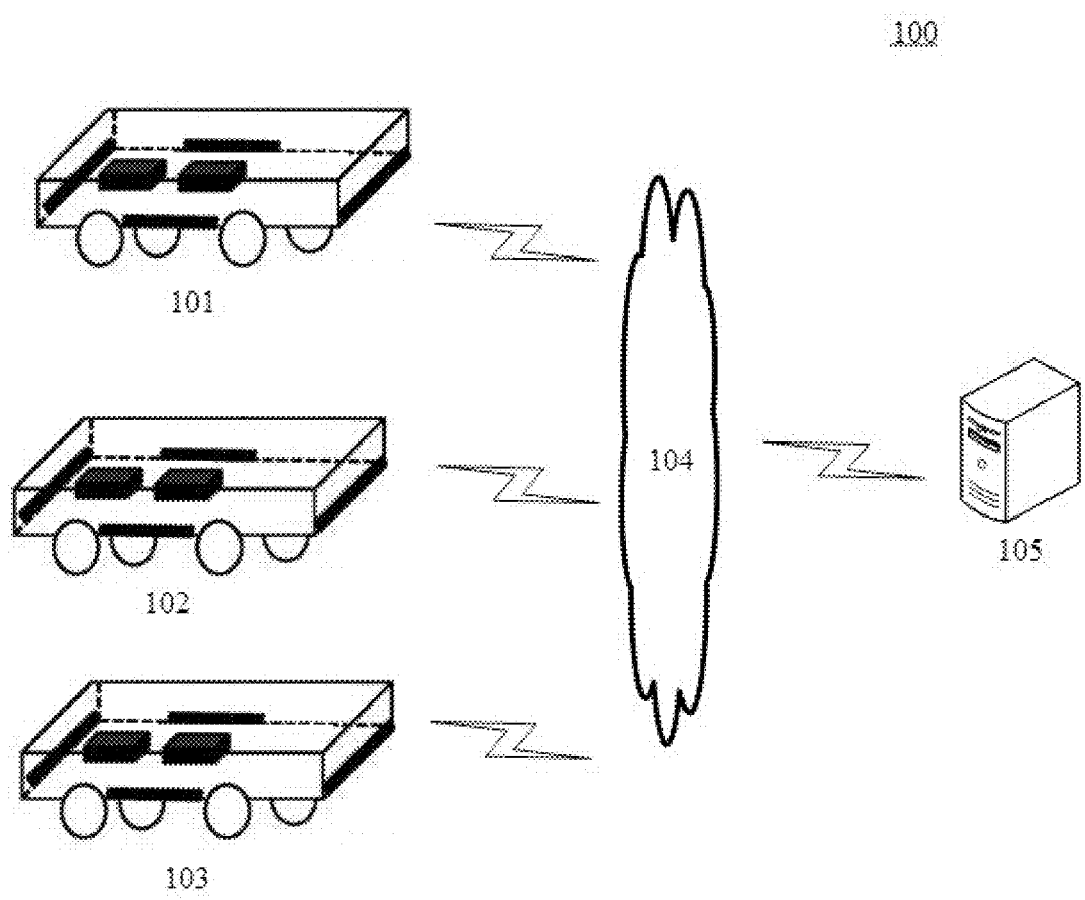
FIG. 1 is an example system architecture in which an embodiment of the present disclosure may be applied.

The present disclosure is described in further detail below with reference to the accompanying drawings and examples. It is to be understood that the specific embodiments described herein are merely illustrative of the invention and are not restrictive of the invention. It is also to be noted that, for ease of description, only parts related to the invention are shown in the drawings.

It is noted that the embodiments in the present disclosure and the features in the embodiments may be combined with each other without conflict. The present disclosure will now be described in detail with reference to the accompanying drawings and examples.

FIG. 1 illustrates an example system architecture 100 to which a method for determining a position of a shelf or an apparatus for determining a position of a shelf in embodiments of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. The network 104 may include various types of connections, such as wireless communication links, and the like.

The terminal devices 101, 102, 103 interact with the server 105 through the network 104 to receive or transmit messages or the like. Various communication client applications may be installed on the terminal devices 101, 102, 103, such as instant messaging tools, mailbox clients, and the like.

The terminal devices 101, 102, 103 may be hardware or software. When the terminal devices 101, 102, and 103 are hardware, the terminal devices 101, 102, and 103 may be in-vehicle device having a communication and control function, or may be an automated guided vehicle in which the terminal devices 101, 102, and 103 are mounted. The in-vehicle device can communicate with an automatic driving system of an automated guided vehicle. Alternatively, the functions of the above-described in-vehicle device may also be integrated into the automatic driving system of the automated guided vehicle. When the terminal devices 101, 102, and 103 are software, the terminal devices 101, 102, and 103 may be installed in the automated guided vehicle, which may be implemented as a plurality of pieces of software or software modules (such as pieces of software or software modules used to provide distributed services), or as a single software or software module. It is not specifically limited herein.

The server 105 may be a server providing various services, such as a networked vehicle server providing support for the automatic driving system on the terminal devices 101, 102, 103. The networked vehicle server may analyze and process relevant information of each automated guided vehicle in the network, and feedback the processing result (e.g., scanning route) to the terminal device.

It should be noted that the server may be hardware or software. When the server is hardware, a distributed server cluster composed of multiple servers may be implemented, or a single server may be implemented. When the server is software, it may be implemented as a plurality of pieces of software or software modules (e.g., pieces of software or software modules used to provide distributed services) or as a single software or software module. It is not specifically limited herein.

It should be noted that the method for determining a position of a shelf provided by an embodiment of the present disclosure is generally performed by the server 105, and accordingly, the apparatus for determining the shelf position is generally provided in the server 105.

It should be understood that the number of terminal devices, networks and servers in FIG. 1 is merely illustrative. There may be any number of terminal devices, networks, and servers as desired for implementation.

Figure 2:
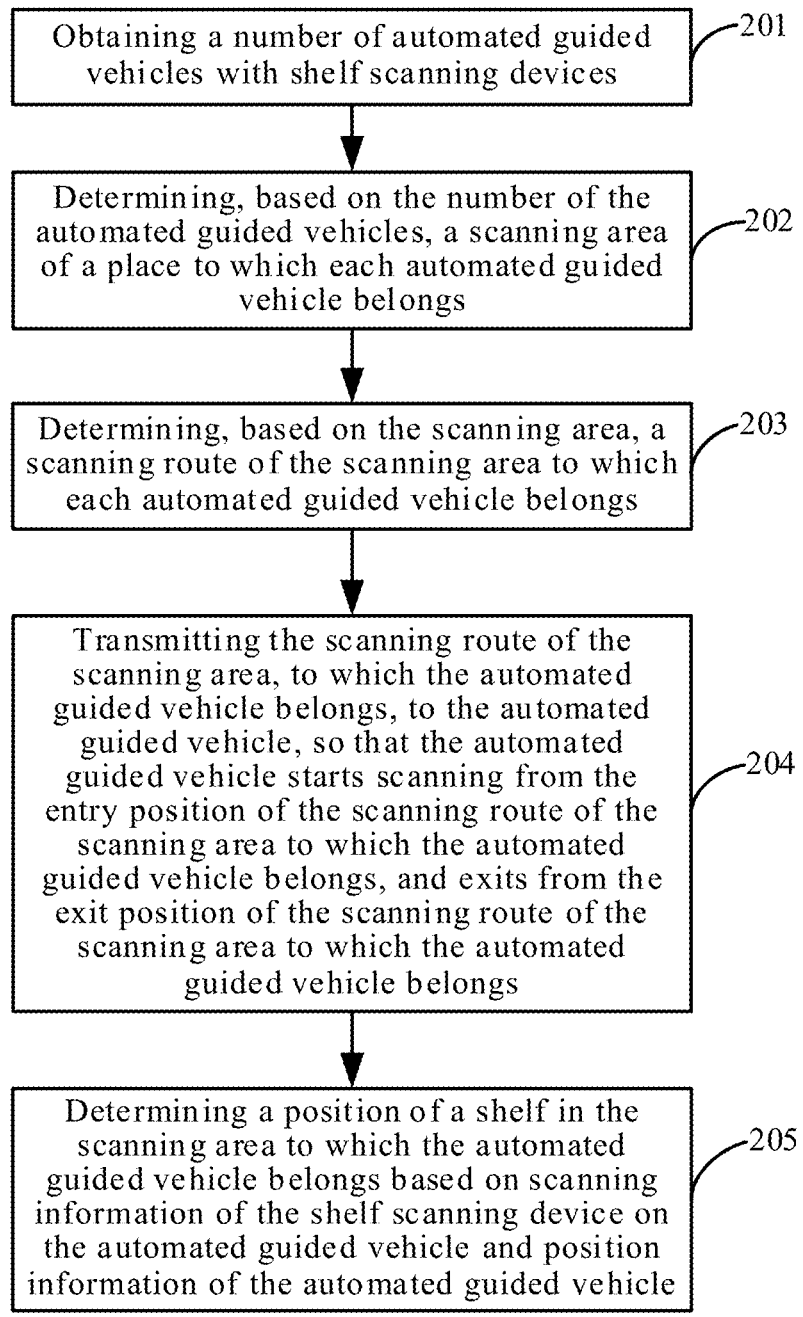
FIG. 2 is a flowchart of a method for determining a position of a shelf according to an embodiment of the present disclosure.

FIG. 2 illustrates a flow 200 of a method for determining a position of a shelf according to an embodiment of the present disclosure, the method for determining the position of the shelf includes the following steps 201-205.

Step 201 includes obtaining a number of automated guided vehicles with shelf scanning devices.

In an embodiment, an execution body (the server 105 shown in FIG. 1), on which the method for determining the position of the shelf is run, may obtain the number of automated guided vehicles with the shelf scanning devices from a terminal device (the terminal device 101, 102, 103 shown in FIG. 1) in real time or from a memory by reading.

In an embodiment, the shelf scanning device is a device for obtaining shelf information (the shelf information includes a shelf number for identifying the shelf) by scanning, and may be a scanner, a camera, or the like. After the shelf scanning device scans a shelf, the execution body determines each shelf in a place and the shelf information of each shelf based on scanning information obtained by the shelf scanning device.

In the present embodiment, the place is a working place of the automated guided vehicles, and further, the working place may be located in a warehouse, such as a cargo warehouse or an unmanned warehouse.

Step 202 includes determining, based on the number of the automated guided vehicles, a scanning area of a place to which each automated guided vehicle belongs.

In the present embodiment, the place may be divided into a plurality of scanning areas according to the number of the automated guided vehicles, and the number of the automated guided vehicles of each scanning area may be set according to requirements. For example, one automated guided vehicle corresponds to one scanning area, or two automated guided vehicles correspond to one scanning area. The number of the automated guided vehicles corresponding to each scanning area may vary.

In view of the unmanned features of some places, the automated guided vehicles in the places may generally be navigated by using visual recognition, such as a two-dimensional code navigation belonging to the visual recognition. A two-dimensional code of a place is adhered to a ground of the place, a sweeper for reading the two-dimensional code of the place is arranged at the bottom of the automated guided vehicle, and the position information of the automated guided vehicle is determined through the sweeper. Since the two-dimensional code navigation is more accurate than the magnetic navigation and the routes of the two-dimensional navigation are easier to be laid and change, the two-dimensional code navigation is easy to be controlled and has no interference with acousto-optic signals. Therefore, the two-dimensional code navigation is suitable for fully automatic unmanned places.

Figure 3:
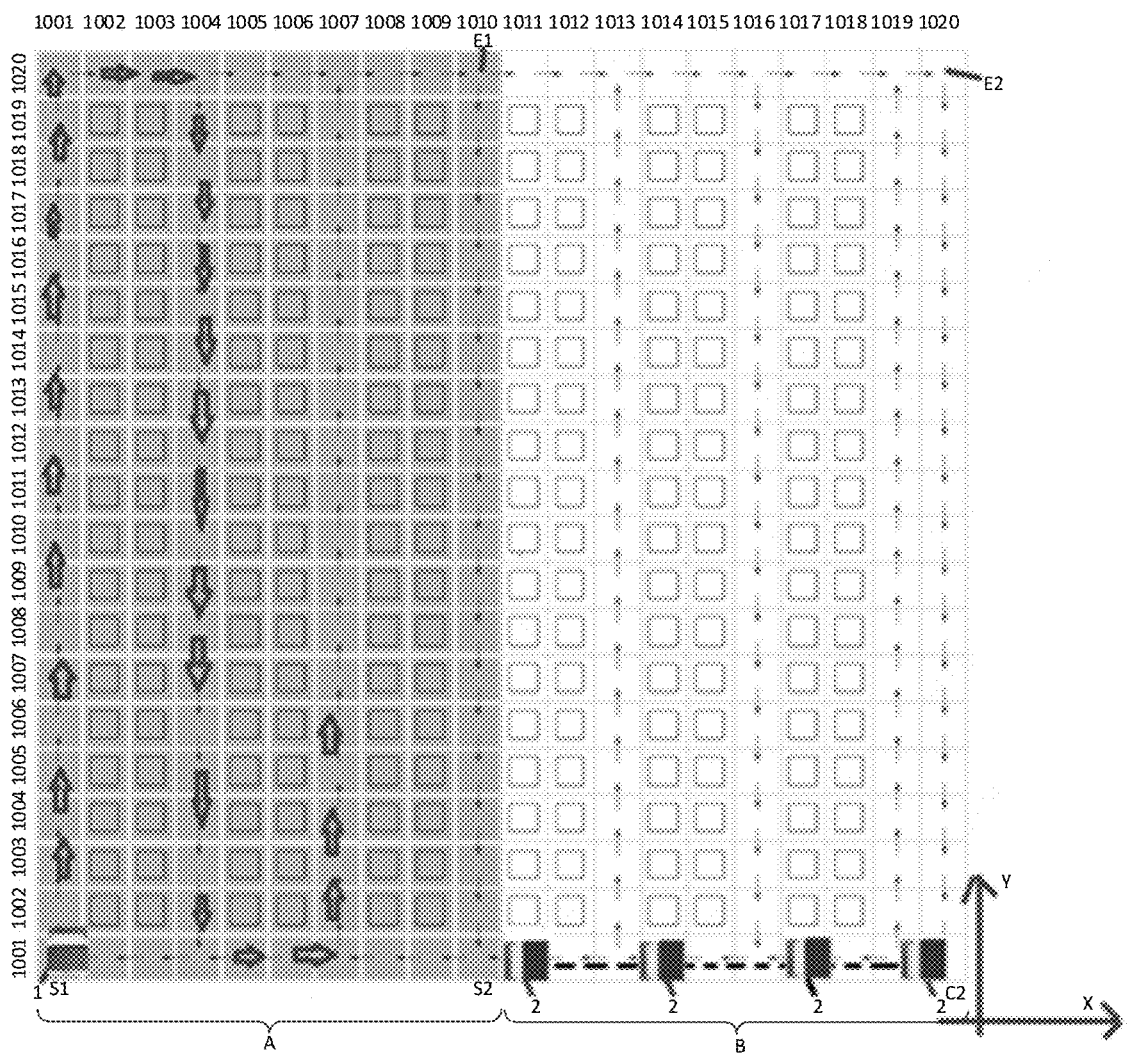
FIG. 3 is a schematic diagram of an application scenario for determining a scanning area of a place to which an automated guided vehicle belongs according to the present disclosure.

Specifically, as shown in FIG. 3, X-axis of the place is from 1001 to 1020, and Y-axis of the place is from 1001 to 1020. There are two automated guided vehicles, vehicle 1 and vehicle 2 in the system.

Further, a length value of the X-axis divided by the number of automated guided vehicles is equal to the number of the scanning areas of the place to which automated guided vehicles belong. In FIG. 3, vehicle 1 corresponds to a scanning area A, and vehicle 2 corresponds to a scanning area B.

Step 203 includes determining, based on the scanning area, a scanning route of the scanning area to which each automated guided vehicle belongs.

In the present embodiment, the scanning route may be specifically provided according to a distribution area of the shelf in the scanning area. As shown in FIG. 3, a traveling route of vehicle 1 is S-shaped (as shown by thick arrows in FIG. 3).

In the present embodiment, the scanning route is a traveling route of the automated guided vehicle when the shelf scanning device of each automated guided vehicle performs scanning. The scanning route of the scanning area to which each automated guided vehicle belongs includes an entry position, an exit position, and a route between the entry position and the exit position. Further, for each automated guided vehicle, there may be a plurality of routes between the entry position and the exit position. In the present embodiment, a route that passes through a largest number of shelves may be selected as the scanning route.

As shown in FIG. 3, the entry position of the scanning route in the scanning area A is the minimum value of the X-axis and the minimum value of the Y-axis of the scanning area A, and the entry position of the scanning route in the scanning area B is the minimum value of the X-axis and the minimum value of the Y-axis of the scanning area B. The exit position of the scanning route in the scanning area A and is the maximum value of the X-axis and the maximum value of the Y-axis in the scanning area A, and the exit position of the scanning route in the scanning area B and is the maximum value of the X-axis and the maximum value of the Y-axis in the scanning area B. The entry position of the scanning route of the scanning area A is S1: 10011001, and the exit position of the scanning route of the scanning area A is E1: 10011010. The entry position of the scanning route of the scanning area B is S2:10101001, and the exit position of the scanning route of the scanning area B is E2: 10201020.

Step 204 includes transmitting the scanning route of the scanning area, to which the automated guided vehicle belongs, to the automated guided vehicle, so that the automated guided vehicle starts scanning from the entry position of the scanning route of the scanning area to which the automated guided vehicle belongs, and exits from the exit position of the scanning route of the scanning area to which the automated guided vehicle belongs.

In the present embodiment, the traveling principle of the automated guided vehicle is locking and then traveling according to point locking mechanism of the traffic, and the automated guided vehicle can travel to a location where point locking is successful only after the point locking is successful. At a given time, a given place can only be locked by one automated guided vehicle, so that a crash between the automated guided vehicles can be prevented. The points that are locked are released only after the automated guided vehicles have completely left.

Further, after the scanning route of the scanning area to which the automated guided vehicle belongs is transmitted to the automated guided vehicle, the automated guided vehicle may travel along the scanning route according to the traveling principle. As can be seen from the above-mentioned content, the scanning route of the scanning area to which each automated guided vehicle belongs includes the entry position, the exit position, and the route located between the entry position and the exit position. In this embodiment, in order to achieve a complete scanning of the shelves in the respective scanning areas, the automated guided vehicle starts scanning from the entry position of the scanning route of the scanning area to which each automated guided vehicle belongs, and exits from the exit position of the scanning route of the scanning area to which each automated guided vehicle belongs.

Step 205 includes determining a position of a shelf in the scanning area to which the automated guided vehicle belongs based on scanning information of the shelf scanning device on the automated guided vehicle and position information of the automated guided vehicle.

In the present embodiment, the scanning information includes a shelf number, and the position information of the automated guided vehicle includes coordinate point information of the place, the coordinate point information includes coordinate values of respective positions in the place. The position of the shelf includes the coordinate value of the shelf in the place and the shelf number.

In some alternative implementations of the present embodiment, the determining the position of the shelf in the scanning area to which the automated guided vehicle belongs based on the scanning information of the shelf scanning device on the automated guided vehicle and the position information of the automated guided vehicle, includes:

obtaining, in real time, the shelf number scanned by the shelf scanning device on the automated guided vehicle and coordinate point information of the place where the automatic guiding vehicle travels, the coordinate point information corresponding to the shelf number; and binding each shelf number to the obtained coordinate point information of the place corresponding to each shelf number, to obtain positions of the shelves in the scanning area to which the automated guided vehicle belongs.

In this alternative embodiment, each time a shelf is scanned by the automated guided vehicle, the shelf number of the shelf and the coordinate point information of the place corresponding to the shelf number are collected, and the coordinate point information of the place corresponding to the shelf number is bound to the shelf number to obtain the actual position of the shelf in the place, so that the position of the shelf can be easily and quickly obtained.

In other alternative implementations of the present embodiment, the shelf scanning device may be provided on the top of the automated guided vehicle, the ground of the place is pasted with the two-dimensional code of the place that identifies the coordinate value of each position in the place, the bottom of the automated guided vehicle is provided with the sweeper that reads the two-dimensional code of the place, the execution body may determine the position information of the automated guided vehicle based on the two-dimensional code of the place where the automated guided vehicle travels, and may obtain the position of the shelf by binding the coordinate value of the shelf in the position information of the automated guided vehicle and the shelf number in the scanning information of the shelf scanning device. Specifically, in the present alternative implementation, the determining the position of the shelf in the scanning area to which the automated guided vehicle belongs based on scanning information of the shelf scanning device on the automated guided vehicle and the position information of the automated guided vehicle, includes:

obtaining, in real time, the two-dimensional code of the shelf scanned by the shelf scanning device on the automated guided vehicle and the two-dimensional code of the place where the automated guided vehicle travels, the two-dimensional code of the place corresponding to the two-dimensional code of the shelf, where the two-dimensional code of the shelf is bound to the shelf number of the shelf, and the two-dimensional code of the place is bound to a coordinate point position in the place; and obtaining positions of the shelves of the scanning area to which the automated guided vehicle belongs based on each two-dimensional code of the place corresponding to each two-dimensional code of the shelf.

In this alternative implementation, since the two-dimensional code of the shelf is bound to the shelf number of the shelf, and the two-dimensional code of the place is bound to the position of the coordinate point in the place, after the two-dimensional code of the shelf is obtained by the shelf scanning device on the automated guided vehicle, and the two-dimensional code of the place corresponding to the two-dimensional code of the shelf is obtained by the sweeper provided at the bottom of the automated guided vehicle and used to read the two-dimensional code of the place, the shelf number and the position of the coordinate point in the place corresponding to the shelf number may be determined, so that the position of the shelf can be conveniently and quickly positioned.

Figure 4:
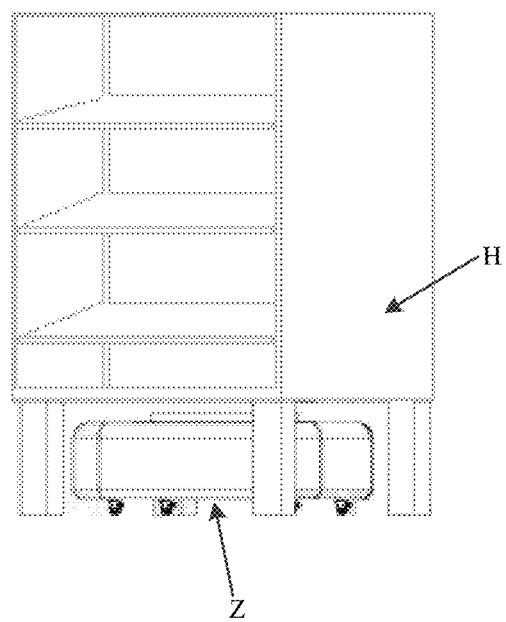
FIG. 4 is a schematic diagram of an application scenario for determining a position of a shelf in a scanning area to which an automated guided vehicle belongs according to the present disclosure.

Specifically, as shown in FIG. 4, when the automated guided vehicle Z scans on the scanning route of the scanning area to which the automated guided vehicle belongs, the automated guided vehicle Z passes the shelf H through a space below the shelf H, the position information of the automated guided vehicle Z may be obtained by the sweeper (not shown) at the bottom of the automated guided vehicle Z, and the scanning information may be obtained by the shelf scanning device (not shown) at the top of the automated guided vehicle Z scanning the code of the shelf (not shown) at the bottom of the shelf.

Further, N (N>1) automated guided vehicles may be allowed to travel simultaneously in the place, and each automated guided vehicle reports the position information of the automated guided vehicle and the scanning information of the shelf to the execution body while traveling. The execution body determines the coordinate value of each shelf in the place according to the position information, and binds the coordinate value as the key value to the shelf number in the obtained scanning information to obtain the position of the shelf. When each automated guided vehicle reports for the first time, the system adds a record of the shelf position (key, value), where the key is the coordinate value, and the value is the shelf number. When an automated guided vehicle travels, the automated guided vehicle may repeat a route, thereby the automated guided vehicle may report repeated position information and the scanning information of the shelf to the execution body, and the execution body updates the shelf number in real time according to the coordinate value.

Embodiments of the present disclosure provide a method and apparatus for determining the position of shelf. The method includes: firstly, obtaining a number of automated guided vehicles with shelf scanning devices; secondly, determining, based on the number of the automated guided vehicles, a scanning area of a place to which each automated guided vehicle belongs; then, determining, based on the scanning area, a scanning route of the scanning area to which each automated guided vehicle belongs; transmitting the scanning route of the scanning area to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; finally, determining a position of a shelf in the scanning area to which the automated guided vehicle belongs based on scanning information of a shelf scanning device on the automated guided vehicle and position information of the automated guided vehicle. The scanning area and the scanning route may be automatically assigned to the automated guided vehicle with the shelf scanning device. When the automated guided vehicle travels on the scanning route of the scanning area, a position of a shelf is determined based on the scanning information of the shelf scanning device and the position information of the automated guided vehicle, so that manual work is not required, manpower is saved, and an accuracy of positioning a shelf is improved.

Figure 5:
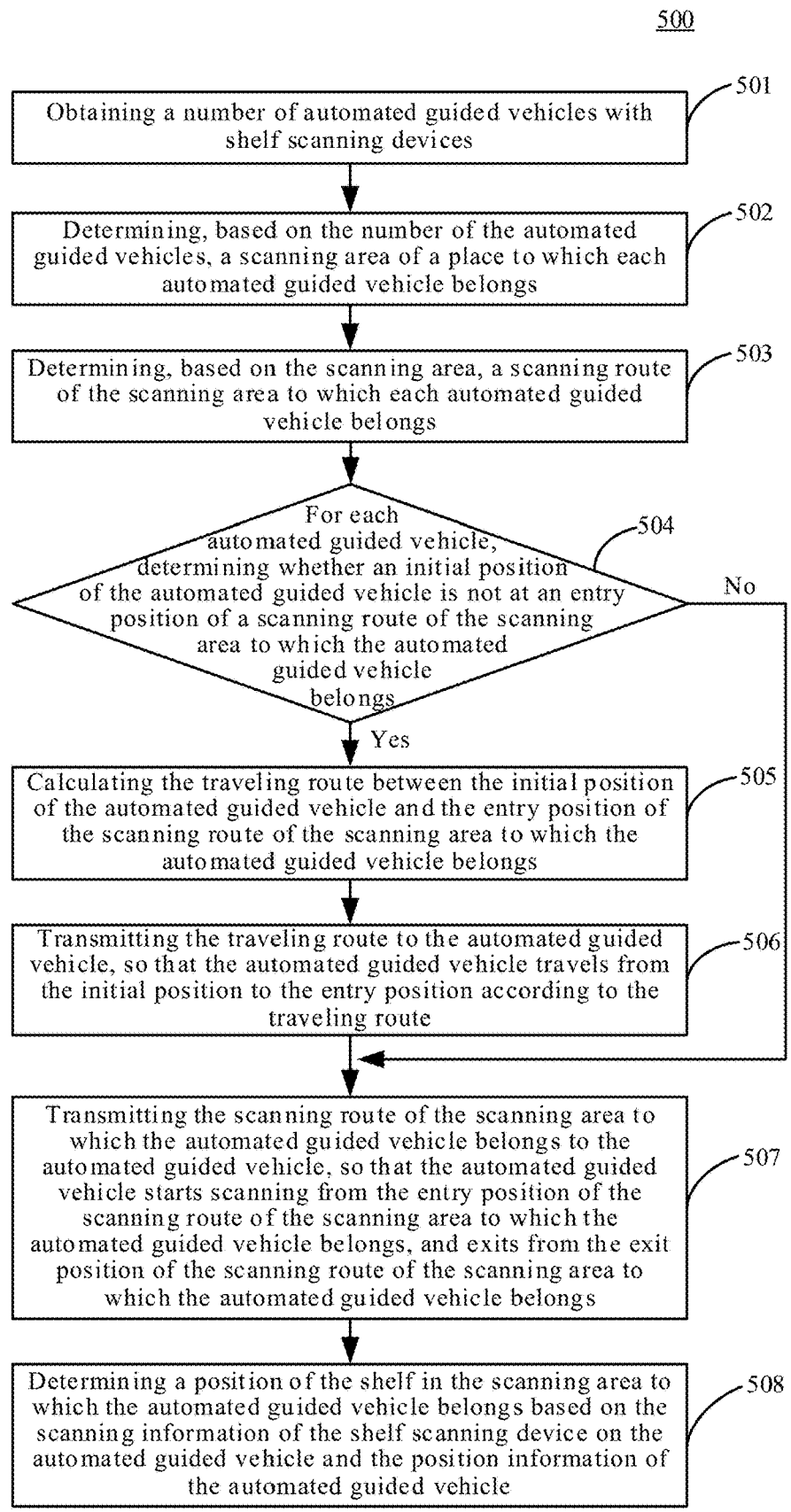
FIG. 5 is a flowchart of a method for determining a position of a shelf according to another embodiment of the present disclosure.

FIG. 5 illustrates a flow 500 of a method for determining the position of the shelf according to another embodiment of the present disclosure. The method for determining the position of the shelf includes the following steps 501-508.

Step 501 includes obtaining a number of automated guided vehicles with shelf scanning devices, and thereafter, performing step 502.

Step 502 includes determining, based on the number of the automated guided vehicles, a scanning area of a place to which each automated guided vehicle belongs, and then performing step 503.

Step 503 includes determining, based on the scanning area, a scanning route of the scanning area to which each automated guided vehicle belongs, and thereafter, performing step 504.

The operations and features in steps 501-503 correspond to the operations and features in steps 201-203. Therefore, the description of the operations and features in steps 201-203 are also applicable to steps 501-503, and the details are not described herein.

Step 504 includes for each automated guided vehicle, determining whether an initial position of the automated guided vehicle is not at an entry position of a scanning route of the scanning area to which the automated guided vehicle belongs; if yes, performing step 505; and if not, performing step 507.

In this embodiment, the initial position of the automated guided vehicle is the position of the automated guided vehicle before performing scanning.

In this embodiment, when the initial position of the automated guided vehicle is not at the entry position of the scanning route of the scanning area to which the automated guided vehicle belongs, it is necessary to control the automated guided vehicle to enter the entry position of the scanning route of the scanning area to which the automated guided vehicle belongs, and the shelf scanning device may be closed during the entering process.

Step 505 includes calculating the traveling route between the initial position of the automated guided vehicle and the entry position of the scanning route of the scanning area to which the automated guided vehicle belongs, and then performing step 506.

In this embodiment, the traveling route is a driving route for the automated guided vehicle from the initial position to the entry position. The traveling route between the initial position and the entry position of the automated guided vehicle includes an initial position, an entry position, and a route between the initial position and the entry position. Further, for each automated guided vehicle, there may be a plurality of routes between an initial position and an entry position. In the present embodiment, the shortest route may be selected as the present traveling route.

As shown in FIG. 3, the initial position C2 of the vehicle 2 is not the same as the entry position S2 of the vehicle 2, and it is necessary to automatically dispatch the vehicle 2 to the entry position S2.

The traveling route of the vehicle 2 is: from the initial position C2: 10201001 of the vehicle 2, passing sequentially through the 10191001 . . . 10171001 . . . 10141001 . . . 10111001, and then to the entry position S2: 10101001.

Step 506 includes transmitting the traveling route to the automated guided vehicle, so that the automated guided vehicle travels from the initial position to the entry position according to the traveling route, and thereafter, performing the step 507.

In the present embodiment, after the automated guided vehicle obtains the traveling route, the automated guided vehicle may travel along the traveling route according to the traveling principle in the above-mentioned step 204. As can be seen from the above, the route between the initial position and the entry position of the automated guided vehicle includes the initial position, the entry position, and the route between the initial position and the entry position. In the present embodiment, the shortest route between the initial position and the entry position may be selected for traveling, and thus a travel distance of the automated guided vehicle may be saved and the time for reaching the entry position may be reduced.

Step 507 includes transmitting the scanning route of the scanning area to which the automated guided vehicle belongs to the automated guided vehicle, so that the automated guided vehicle starts scanning from the entry position of the scanning route of the scanning area to which the automated guided vehicle belongs, and exits from the exit position of the scanning route of the scanning area to which the automated guided vehicle belongs, and then performing step 508.

In the present embodiment, after the automated guided vehicle receives the scanning route of the scanning area to which the automated guided vehicle belongs, the shelf scanning device is started to scan the shelf information on the shelf in the place in real time.

Step 508 includes determining a position of the shelf in the scanning area to which the automated guided vehicle belongs based on the scanning information of the shelf scanning device on the automated guided vehicle and the position information of the automated guided vehicle.

The operations and features in steps 507-508 correspond to the operations and features in steps 204-205. Therefore, the description of the operations and features in steps 204-205 are also applicable to steps 507-508, and the details are not described herein.

According to the method for determining the position of the shelf, when the initial position of the automated guided vehicle is not at the entry position of the scanning route of the scanning area to which the automated guided vehicle belongs, the traveling route between the initial position and the entry position is calculated and transmitted to the automated guided vehicle, so that the automated guided vehicle may quickly travel to the entry position, thereby ensuring efficiency of positioning the position of the shelf.

Figure 6:
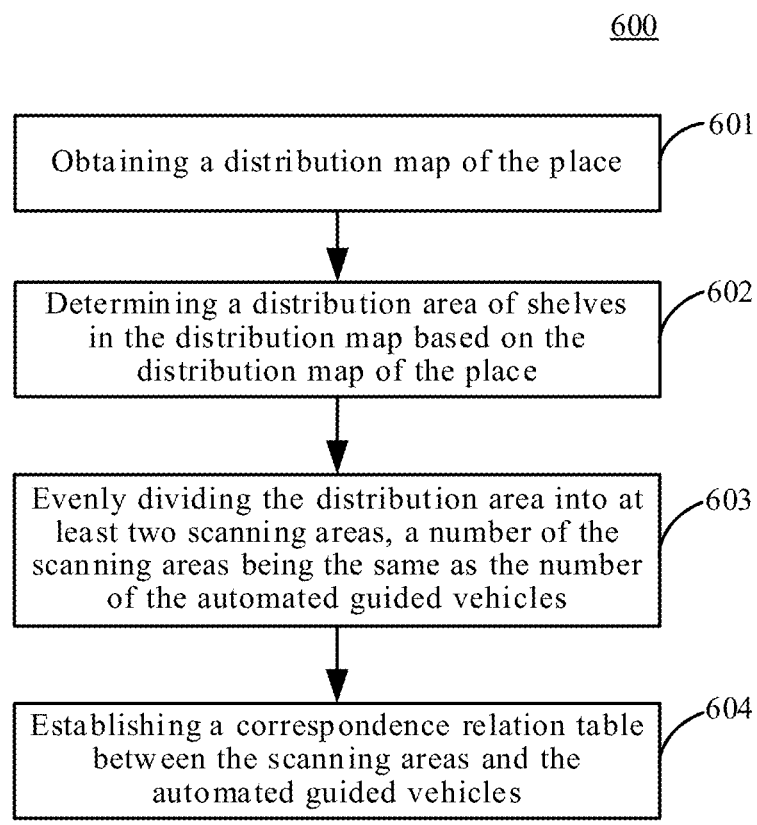
FIG. 6 is a flowchart of a method of determining the scanning area of the place to which each automated guided vehicle belongs according to an embodiment of the present disclosure.

In order to obtain scanning areas of the place that are better divided, in some alternative implementations of the present embodiment, further reference is made to FIG. 6. FIG. 6 illustrates a flow 600 of a method for determining the scanning area of the place to which each the automated guided vehicle belongs in accordance with an embodiment of the present disclosure. The method includes the following steps 601-604.

Step 601 includes obtaining a distribution map of the place.

In the alternative implementation, the execution body on which the method for determining the position of the shelf is run may obtain the distribution map of the place in real-time or by means or memory reading.

Step 602 includes determining a distribution area of shelves in the distribution map based on the distribution map of the place.

In the alternative implementation, the shelf distribution area is provided in the place, and different types of shelves may be arranged in rows in the shelf distribution area, and an idle area (such as an area of squares in FIG. 3) is arranged between areas of lines of shelves, so that goods may be loaded to the shelves. In this embodiment, the shelf distribution area includes the areas where lines of shelves are arranged and the idle area between the areas where lines of shelves are arranged.

Step 603 includes evenly dividing the distribution area into at least two scanning areas, a number of the at least two scanning areas being the same as the number of the automated guided vehicles.

In this alternative implementation, the number of the scanning areas is set to be the same as the number of the automated guided vehicles, so that it is possible to ensure that one scanning area corresponds to one automated guided vehicle, so that the automated guided vehicles do not interfere with each other when the automated guided vehicles scan respective scanning areas.

Step 604 includes establishing a correspondence relation table between the scanning areas and the automated guided vehicles.

In this alternative implementation, establishing the correspondence relation table between the scanning areas and the automated guided vehicles facilitates querying the relation between each automated guided vehicle and the scanning area.

As shown in FIG. 3, the vehicle 1 corresponds to the scanning area A, the vehicle 2 corresponds to the scanning area B, and the correspondence relation table between the scanning area and the automated guided vehicle may be a table as shown in Table 1. The automated guided vehicle corresponding to each scanning area may be inquired in real time based on the corresponding relation table between the scanning area and the automated guided vehicle.

TABLE 1

| Number of the automated guided vehicle | Scanning area |
|---|---|
| 1 | Scanning area A |
| 2 | Scanning area B |

According to the method for determining the scanning area of the place to which each automated guided vehicle belongs, the distribution area is evenly divided into at least two scanning areas, and the number of the at least two scanning areas is the same as the number of the automated guided vehicles, so that one automated guided vehicle corresponds to one scanning area, and the automated guided vehicles do not interfere with each other. Further, the scanning areas are divided on the basis of the distribution area of the shelf in the place, thereby ensuring the accuracy of the position of the shelf in each scanning area.

After determining the position of the shelf in the place, it is necessary to check whether the position of the shelf is accurate. In some alternative implementations of the present embodiment, the above method for determining the position of the shelf, after determining the position of the shelf of the scanning area to which the automatic guide vehicle belongs, further includes the steps of:

comparing positions of shelves in each scanning area with preset correct positions of the shelves, to obtain a position of a shelf located in an incorrect position; calculating, for the automated guided vehicle in the scanning area with the shelf located in the incorrect position, a return route between the exit position and the position of the shelf located in the incorrect position; and transmitting the return route to the automated guided vehicle so that the automated guided vehicle travels to the shelf located in the incorrect position according to the return route after reaching the exit position of the scanning route of the scanning area to which the automated guided vehicle belongs; after the automated guided vehicle reaches the position of the shelf located in the incorrect position, scanning the shelf located in the incorrect positions, and checking whether the scanned shelf is the shelf located in the incorrect position according to a scanning result.

In the alternative implementation, an idle area (such as an area of squires in FIG. 3) is provided between the areas where lines of shelves are arranged, so that the goods may be loaded to the shelves. Due to the fact that the shelf distribution area includes the areas where lines of shelves are arranged and the idle area between the areas where lines of shelves are arranged, the preset correct positions may be the positions of the areas where lines of shelves are arranged.

After comparing the positions of the shelves with the positions of the areas where lines of shelves are arranged, if the positions of the shelves are not in the positions of the areas where lines of shelves are, it is determined that the positions of the shelves are incorrect. Further, in the scanning process of the automated guided vehicle, the positions of the shelves located in incorrect positions may be scanned by setting the scanning routes of the automated guided vehicles.

The return route includes the exit position, the position of the shelf located in an incorrect position, and the route located between the exit position and the position of the shelf located in the incorrect position. Further, for each automated guided vehicle, there may be a plurality of routes between the exit position and the position of the shelf located in the incorrect position. In this embodiment, a route that passing through the largest number of shelves may be selected as the return route.

In the alternative implementation, when the position of the shelf in the scanning result is the same as the position of the shelf located in the incorrect position, it is determined that the shelf in the incorrect position is indeed the shelf that locates in the incorrect position. When the position of the shelf in the scanning result is different from the position of the shelf located in the incorrect position, it is necessary to further determine whether the position of the shelf in the scanning result is in the areas where lines of shelves are arranged. If yes, it is determined that the incorrect position of the shelf is correct.

According to the method for determining the position of the shelf according to the alternative implementation, after determining the position of the shelf in the scanning area to which the automated guided vehicle belongs, comparing the positions of the shelves in each scanning area with the preset correct positions of the shelves, determining the positions of the shelves located in incorrect positions, and for the automated guided vehicle in the scanning area with the shelves located in incorrect positions, transmitting the return route to the automated guided vehicle, so that the automated guided vehicle again scans the shelves located in incorrect positions and checks according to the scanning result whether the shelves located in incorrect positions are indeed shelves located in incorrect positions, and then the automated guided vehicle returns to the shelves located in incorrect positions after the scanning of the automated guided vehicle is completed, thereby ensuring the position accuracy of the shelves located in incorrect positions.

Further, after the shelves are determined as the shelves located in incorrect positions, it is necessary to carry the shelves located in incorrect positions to the correct positions of the shelves. To this end, the automated guided vehicle may be an automated guided vehicle provided with a loading member (for example, a lifting platform, a manipulator), the loading member may be used to carry the shelves. In some alternative implementations of the present embodiment, the automated guided vehicle is provided with the lifting platform, and in this alternative implementation, the above-described method for determining the position of the shelf, after obtaining the positions of the shelves located in incorrect positions or determining based on the scanning the shelves in the incorrect positions are indeed the shelves located in the incorrect positions, further includes the following steps:

calculating a conveyance route between the position of the shelf located in the incorrect position and a preset correct position of the shelf, and transmitting the conveyance route to the automated guided vehicle; after the automated guided vehicle reaches the position of the shelf located in the incorrect position, controlling the lifting platform of the automated guided vehicle to reach a bottom of the shelf located in the incorrect position, so that the automated guided vehicle conveys the shelf located in the incorrect position to the preset correct position of the shelf according to the conveyance route.

In the alternative implementation, the correct position of the shelves is the preset positions of the shelves, for example, the correct positions of the shelves are the positions of the areas where lines of shelves are arranged in the place distribution map.

The conveyance route includes the position of the shelves located in incorrect positions, the correct positions of the shelves, and the routes between the positions of the shelves located in incorrect positions and the correct positions of the shelves. In this embodiment, the shortest route between the positions of the shelves located in incorrect positions and the correct positions of the shelves may be selected as the conveyance route.

In the alternative implementation, when the lifting platform on the automated guided vehicle is raised to the bottom of the shelf located in incorrect position, the lifting platform on the automated guided vehicle supports the shelf located in incorrect position. Therefore, when the automated guided vehicle returns to the correct position of the shelf according to the conveyance route, the shelf located in incorrect position also returns with the automated guided vehicle to the correct position of the shelf. Further, after the shelf located in incorrect position reaches the correct position of the shelf, the lifting platform on the automated guided vehicle may be controlled to be separated from the bottom of the shelf located in incorrect position, so that the shelf located in incorrect position is placed in the correct position of the shelf.

According to the method for determining the position of the shelf according to the alternative implementation, after the position of the shelf located in incorrect position is determined, the conveyance route of the automated guided vehicle is calculated, and the lifting platform of the automated guided vehicle is controlled to reach the bottom of the shelf located in incorrect position, so that the automated guided vehicle conveys the shelf in incorrect position to the preset correct position of the shelf according to the conveyance route, thereby effectively correcting the position of the shelf located in incorrect position.

Figure 7:
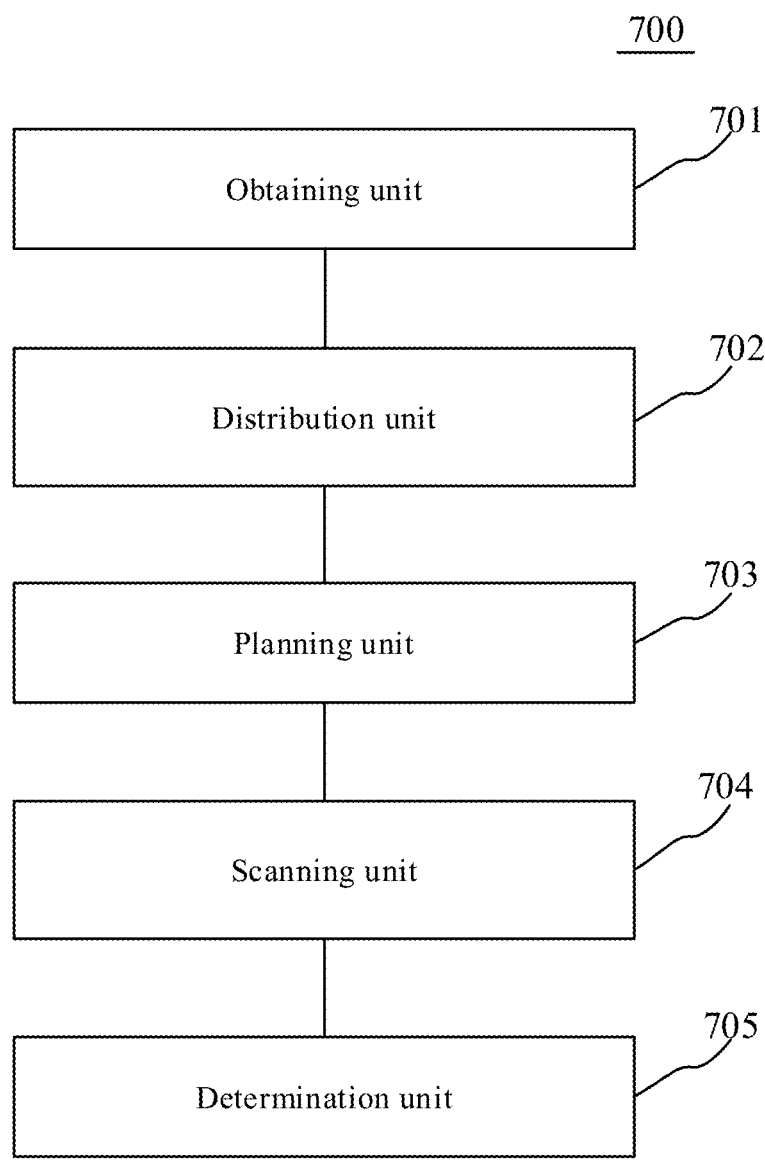
FIG. 7 is a schematic structural diagram of an apparatus for determining a position of a shelf according to an embodiment of the present disclosure.

Further referring to FIG. 7, as an implementation of the method shown in each of the above figures, the present disclosure provides an embodiment of an apparatus for determining the position of the shelf, which corresponds to the method embodiment shown in FIG. 2 and is particularly applicable to various electronic devices.

As shown in FIG. 7, an embodiment of the present disclosure provides an apparatus 700 for determining the position of the shelf, including an obtaining unit 701, a distribution unit 702, a planning unit 703, a scanning unit 704, and a determination unit 705. The obtaining unit 701 may be configured to obtain the number of automated guided vehicles with a shelf scanning device. The distribution unit 702 may be configured to determine, based on the number of the automated guided vehicles, a scanning area of a place to which each automated guided vehicle belongs. The planning unit 703 may be configured to determine, based on each scanning area, a scanning route of the scanning area to which each automated guided vehicle belongs. The scanning unit 704 may be configured to transmit the scanning route of the scanning area, to which the automated guided vehicle belongs, to the automated guided vehicle, so that the automated guided vehicle starts scanning from the entry position of the scanning route of the scanning area to which the automated guided vehicle belongs, and exits from the exit position of the scanning route of the scanning area to which the automated guided vehicle belongs. The determination unit 705 may be configured to determine the position of the shelf in the scanning area to which the automated guided vehicle belongs based on scanning information of the shelf scanning device on the automated guided vehicle and position information of the automated guided vehicle.

In the present embodiment, in the apparatus 700 for determining the position of the shelf, the specific processing and the technical effects thereof of the obtaining unit 701, the distribution unit 702, the planning unit 703, the scanning unit 704, and the determination unit 705 may be referred to step 201, step 202, step 203, step 204, and step 205, respectively, in the corresponding embodiments of FIG. 2.

In some embodiments, the apparatus 700 further includes a response unit (not shown) and a transmission unit (not shown). The response unit may be configured to calculate a traveling route between the initial position and the entry position in response to determining that the initial position of the automated guided vehicle is not at the entry position of the scanning route of the scanning area to which the automated guided vehicle belongs. The transmission unit may be configured to transmit the traveling route to the automated guided vehicle so that the automated guided vehicle travels from the initial position to the entry position according to the traveling route.

In some embodiments, the above distribution unit 702 includes an obtaining module (not shown), a determination module (not shown), a division module (not shown), and a table establishing module (not shown). An obtaining module may be configured to obtain a distribution map of the place. The determination module may be configured to determine a distribution area of the shelves in the distribution map based on the distribution map of the place. The division module may be configured to evenly divide the distribution area into at least two scanning areas, and the number of the scanning areas is the same as the number of the at least two automated guided vehicles. The table establishing module may be configured to establish a correspondence relation table between the scanning areas and the automated guided vehicles.

In some embodiments, the apparatus 700 further includes a comparison unit (not shown), a return unit (not shown), a route-return unit (not shown), a checking unit (not shown). The comparison unit may be configured to compare positions of shelves in each scanning area with preset correct positions of the shelves, to obtain a position of a shelf located in an incorrect position. The return unit may be configured to calculate, for the automated guided vehicle in the scanning area with the shelf located in the incorrect position, a return route between the exit position and the position of the shelf located in the incorrect position. The route-return unit may be configured to transmit the return route to the automated guided vehicle so that the automated guided vehicle travels to the shelf located in the incorrect position according to the return route after reaching the exit position of the scanning route of the scanning area to which the automated guided vehicle belongs. The checking unit may be configured to scan the shelf located in the incorrect positions, and check whether the position of the scanned shelf is indeed the shelf located in the incorrect position according to a scanning result.

In some embodiments, the automatic guided vehicle described above is provided with a lifting platform. The apparatus 700 further includes a calculation unit (not shown) and a conveyance unit (not shown). The calculation unit may be configured to calculate a conveyance route between the position of the shelf located in the incorrect position and a preset correct position of the shelf, and transmitting the conveyance route to the automated guided vehicle. The conveyance unit may be configured to control the lifting platform of the automated guided vehicle to reach a bottom of the shelf located in the incorrect position, so that the automated guided vehicle conveys the shelf located in the incorrect position to the preset correct position of the shelf according to the conveyance route after the automated guided vehicle reaches the position of the shelf located in the incorrect position.

In some embodiments, the scanning information includes a shelf number, and the position information of the automated guided includes vehicle coordinate point information of the place; the determination unit 705 includes an information obtaining module (not shown) and a position obtaining module (not shown). The information obtaining module may be configured to obtain, in real time, the shelf number scanned by the shelf scanning device on the automated guided vehicle and the coordinate point information of the place where the automatic guiding vehicle travels, automated guided the coordinate point information corresponding to the shelf number. The position obtaining module may be configured to bind each shelf number to the obtained coordinate point information corresponding to each shelf number, to obtain the position of the shelf in the scanning area to which the automated guided vehicle belongs.

In some embodiments, the bottom of the automated guided vehicle is provided with a sweeper for reading the two-dimensional code of the place. The determination unit 705 includes a code obtaining module (not shown) and a position obtaining module (not shown). The code obtaining module is configured to obtaining, in real time, a two-dimensional code of the shelf scanned by the shelf scanning device on the automated guided vehicle and the two-dimensional code of the place where the automated guided vehicle travels, the two-dimensional code of the place corresponding to the two-dimensional code of the shelf, where the two-dimensional code of the shelf is bound to the shelf number of the shelf, and the two-dimensional code of the place is bound to a position of a coordinate point of the place. The position obtaining module is configured to obtain the position of the shelf in the scanning area to which the automated guided vehicle belongs based on two-dimensional codes of shelves and the two-dimensional code of the place corresponding to the two-dimensional codes of shelves.

An apparatus for determining a position of a shelf is provided in an embodiment of the present disclosure. First, an obtaining unit 701 obtains a number of automated guided vehicles with shelf scanning devices; second, the distribution unit 702 determines, based on the number of the automated guided vehicles, a scanning area of a place to which each automated guided vehicle belongs. Then, the planning unit 703 determines, based on the scanning area, a scanning route of the scanning area to which each automated guided vehicle belongs. Again, the scanning unit 704 transmits the scanning route of the scanning area, to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs. Finally, the determination unit 705 determines a position of a shelf in the scanning area to which the automated guided vehicle belongs based on scanning information of a shelf scanning device on the automated guided vehicle and position information of the automated guided vehicle. The scanning area and the scanning route may be automatically assigned to the automated guided vehicle with the shelf scanning device. When the automated guided vehicle travels on the scanning route of the scanning area, a position of a shelf is determined based on the scanning information of the shelf scanning device and the position information of the automated guided vehicle, so that manual work is not required, manpower is saved, and an accuracy of positioning a shelf is improved.

Figure 8:
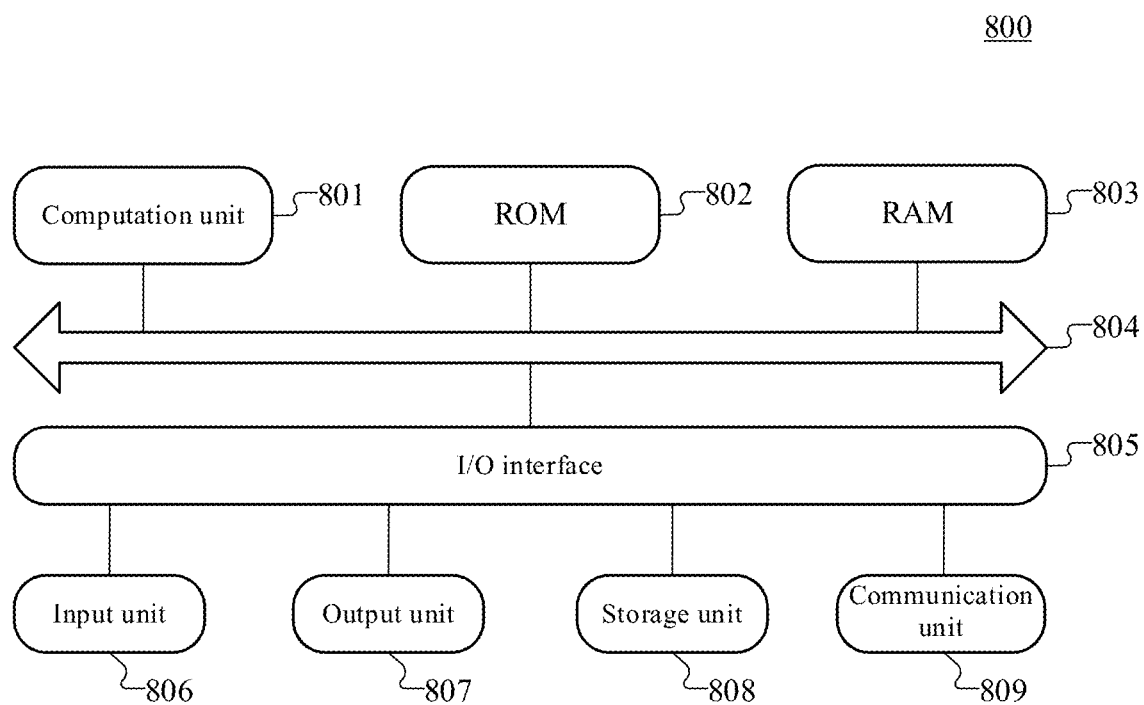
FIG. 8 is a schematic structural diagram of an electronic device adapted to implement an embodiment of the present disclosure.

Referring now to FIG. 8, FIG. 8 illustrates a schematic structural diagram of an electronic device 800 suitable for implementing an embodiment of the present disclosure.

As shown in FIG. 8, the electronic device 800 may include a processing device (e.g., a central processing unit, a graphics processor, or the like) 801, which may perform various appropriate actions and processes according to a program stored in a read-only memory (ROM) 802 or a program loaded from a storage device 808 into a random access memory (RAM) 803. In RAM 803, various programs and data required for operation of the electronic device 800 are also stored. The processing device 801, ROM 802 and RAM 803 are connected to each other via a bus 804. An input/output (I/O) interface 805 is also connected to the bus 804.

Generally, the following devices may be connected to the I/O interface 805: an input device 806 including, for example, a touch screen, a touch pad, a keyboard, a mouse, or the like; an output device 807 including, for example, a liquid crystal display (LCD), a speaker, a vibrator, or the like; a storage device 808 including, for example, a magnetic tape, a hard disk, and the like; and a communication device 809. The communication device 809 may allow the electronic device 800 to wirelessly or wirelessly communicate with other devices to exchange data. Although FIG. 8 illustrates an electronic device 800 having various apparatus s, it should be understood that no implementation or all of the devices shown are required. More or fewer devices may alternatively be implemented or provided. Each block shown in FIG. 8 may represent one device or multiple devices as desired.

In particular, in accordance with embodiments of the present disclosure, the process described above with reference to the flowchart may be implemented as a computer software program. For example, embodiments of the present disclosure include a computer program product including a computer program embodied on a computer readable medium, the computer program including program code for performing the method shown in the flowchart. In such an embodiment, the computer program may be downloaded and installed from the network through the communication device 809, or installed from the storage device 808, or installed from the ROM 802. When the computer program is executed by the processing device 801, the above functions defined in the method of the embodiment of the present disclosure are performed.

It should be noted that the computer readable medium of the embodiments of the present disclosure may be a computer readable signal medium or a computer readable storage medium or any combination of the two. The computer readable storage medium may be, for example, but not limited to, an electrical, magnetic, optical, electromagnetic, infrared, or semiconductor system, apparatus, or device, or any combination of any of the above. More specific examples of the computer-readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing. In embodiments of the present disclosure, the computer readable storage medium may be any tangible medium containing or storing a program that may be used by or in connection with an instruction execution system, apparatus, or device. In embodiments of the present disclosure, the computer readable signal medium may include a data signal propagated in baseband or as part of a carrier wave carrying computer readable program code. Such propagated data signals may take a variety of forms including, but not limited to, electromagnetic signals, optical signals, or any suitable combination of the foregoing. The computer readable signal medium may also be any computer readable medium other than a computer readable storage medium that may transmit, propagate, or transmit a program for use by or in connection with an instruction execution system, apparatus, or device. The program code embodied on the computer readable medium may be transmitted using any suitable medium, including, but not limited to, wires, optical cables, RF (Radio Frequency), and the like, or any suitable combination of the foregoing.

The computer readable medium may be included in the server; It may also be present alone and not assembled into the server. The computer readable medium carries one or more programs that, when executed by the server, cause the server to: obtain a number of automated guided vehicles with shelf scanning devices; determine, based on the number of the automated guided vehicles, a scanning area of a place to which each automated guided vehicle belongs; determine, based on the scanning area, a scanning route of the scanning area to which each automated guided vehicle belongs; transmit the scanning route of the scanning area to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; and determine a position of a shelf in the scanning area to which the automated guided vehicle belongs based on scanning information of a shelf scanning device on the automated guided vehicle and position information of the automated guided vehicle.

The computer program code for performing the operations of the embodiments of the present disclosure may be written in one or more programming languages including object-oriented programming languages such as Java, Smalltalk, C++, and conventional procedural programming languages such as "C" language or similar programming language. The program code may be executed entirely on the user computer, partly on the user computer, as a separate software package, partly on the user computer and partly on the remote computer, or entirely on the remote computer or server. In the case involving a remote computer, the remote computer may be connected to the user computer through any kind of network, including a local area network (LAN) or a wide area network (WAN), or may be connected to an external computer (e.g., via an internet connection using an internet service provider).

Flowcharts and block diagrams in the drawings illustrate architectures, functions, and operations of possible implementations of systems, methods, and computer program products in accordance with various embodiments of the present disclosure. In this regard, each block in a flowchart or block diagram may represent a module, program segment, or portion of code that contains one or more executable instructions for implementing a specified logical function. It should also be noted that in some alternative implementations, the functions noted in the blocks may also occur in an order different from that noted in the drawings. For example, two successively represented blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or operations, or may be implemented with a combination of dedicated hardware and computer instructions.

The elements described in the embodiments of the present disclosure may be implemented in software or in hardware. The described unit may also be provided in a processor, for example, may be described as a processor including an obtaining unit, a distribution unit, a planning unit, a scanning unit and a determination unit. Here, the names of these units do not constitute a limitation on the unit itself in some cases, for example, the obtaining unit may also be described as a unit that is configured to obtain a number of automated guided vehicles with a shelf scanning device;

The above description is only preferred embodiment of the present disclosure and is illustrative of the principles of the techniques employed. It will be appreciated by those skilled in the art that the scope of the invention referred to in the embodiments of the present disclosure is not limited to specific combinations of the above-mentioned technical features, but also covers other technical features formed from any combination of the above-mentioned technical features or equivalents thereof without departing from the inventive concept. For example, the above-mentioned features and the technical features disclosed in the embodiments of the present disclosure (but not limited to) are replaced with each other to form the technical solution.

What is claimed is:

1. A method for determining a position of a shelf, the method comprising:
   obtaining a number of automated guided vehicles with shelf scanning devices;
   determining, based on the number of the automated guided vehicles, a scanning area of a place to which each automated guided vehicle belongs;
   determining, based on the scanning area, a scanning route of the scanning area to which each automated guided vehicle belongs;
   transmitting the scanning route of the scanning area to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; and
   determining a position of a shelf in the scanning area to which the automated guided vehicle belongs based on scanning information of a shelf scanning device on the automated guided vehicle and position information of the automated guided vehicle.

2. The method according to claim 1, further comprising:
   calculating a traveling route between an initial position and the entry position in response to determining that the initial position of the automated guided vehicle is not at the entry position of the scanning route of the scanning area to which the automated guided vehicle belongs; and
   transmitting the traveling route to the automated guided vehicle so that the automated guided vehicle travels from the initial position to the entry position according to the traveling route.

3. The method according to claim 1, wherein the determining the scanning area of the place, to which each automated guided vehicle belongs, comprises:
   obtaining a distribution map of the place;
   determining a distribution area of shelves in the distribution map based on the distribution map of the place;
   evenly dividing the distribution area into at least two scanning areas, a number of the scanning areas being the same as the number of the automated guided vehicles; and
   establishing a correspondence relation table between the scanning areas and the automated guided vehicles.

4. The method according to claim 1, wherein the scanning information comprises a shelf number, and the position information of the automated guided vehicle comprises: coordinate point information of the place;
   the determining the position of the shelf in the scanning area to which the automated guided vehicle belongs based on the scanning information of the shelf scanning device on the automated guided vehicle and the position information of the automated guided vehicle, comprises:
   obtaining, in real time, the shelf number scanned by the shelf scanning device on the automated guided vehicle and the coordinate point information of the place where the automatic guiding vehicle travels, the coordinate point information corresponding to the shelf number; and
   binding each shelf number to the obtained coordinate point information corresponding to each shelf number, to obtain the position of the shelf in the scanning area to which the automated guided vehicle belongs.

5. The method according to claim 1, wherein the bottom of the automated guided vehicle is provided with a sweeper for reading a two-dimensional code of the place;
the determining the position of the shelf in the scanning area to which the automated guided vehicle belongs based on the scanning information of the shelf scanning device on the automated guided vehicle and the position information of the automated guided vehicle, comprises:
obtaining, in real time, a two-dimensional code of the shelf scanned by the shelf scanning device on the automated guided vehicle and the two-dimensional code of the place where the automated guided vehicle travels, the two-dimensional code of the place corresponding to the two-dimensional code of the shelf, wherein the two-dimensional code of the shelf is bound to the shelf number of the shelf, and the two-dimensional code of the place is bound to a position of a coordinate point of the place;
obtaining the position of the shelf in the scanning area to which the automated guided vehicle belongs based on two-dimensional codes of shelves and the two-dimensional code of the place corresponding to the two-dimensional codes of shelves.

6. The method according to claim 1, further comprising:
comparing positions of shelves in each scanning area with preset correct positions of the shelves, to obtain a position of a shelf located in an incorrect position;
calculating, for the automated guided vehicle in the scanning area with the shelf located in the incorrect position, a return route between the exit position and the position of the shelf located in the incorrect position;
transmitting the return route to the automated guided vehicle so that the automated guided vehicle travels to the shelf located in the incorrect position according to the return route after reaching the exit position of the scanning route of the scanning area to which the automated guided vehicle belongs; and
after the automated guided vehicle reaches the position of the shelf located in the incorrect position, scanning the shelf located in the incorrect positions, and checking whether the scanned shelf is the shelf located in the incorrect position according to a scanning result.

7. The method according to claim 6, wherein the automated guided vehicle is provided with a lifting platform; the method further comprises:
calculating a conveyance route between the position of the shelf located in the incorrect position and a preset correct position of the shelf, and transmitting the conveyance route to the automated guided vehicle;
after the automated guided vehicle reaches the position of the shelf located in the incorrect position, controlling the lifting platform of the automated guided vehicle to reach a bottom of the shelf located in the incorrect position, so that the automated guided vehicle conveys the shelf located in the incorrect position to the preset correct position of the shelf according to the conveyance route.

8. An apparatus for determining a position of a shelf, comprising:
a processor;
a storage apparatus, storing at least one instruction, wherein the at least one instruction, when executed by a processor, causes the processor to perform operations comprising:
obtaining a number of automated guided vehicles with shelf scanning devices;
determining, based on the number of the automated guided vehicles, a scanning area of a place to which each automated guided vehicle belongs;
determining, based on the scanning area, a scanning route of the scanning area to which each automated guided vehicle belongs;
transmitting the scanning route of the scanning area, to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; and
determining a position of a shelf in the scanning area to which the automated guided vehicle belongs based on scanning information of a shelf scanning device on the automated guided vehicle and position information of the automated guided vehicle.

9. The apparatus according to claim 8, wherein the operations comprise:
calculating a traveling route between an initial position and the entry position in response to determining that the initial position of the automated guided vehicle is not at the entry position of the scanning route of the scanning area to which the automated guided vehicle belongs; and
a transmission unit, configured to transmit the traveling route to the automated guided vehicle so that the automated guided vehicle travels from the initial position to the entry position according to the traveling route.

10. The apparatus according to claim 8, wherein the determining the scanning area of the place, to which each automated guided vehicle belongs, comprises:
obtaining a distribution map of the place;
determining a distribution area of the shelves in the distribution map based on the distribution map of the place;
evenly dividing the distribution area into at least two scanning areas, a number of the scanning areas being the same as the number of the automated guided vehicles; and
establishing a correspondence relation table between the scanning areas and the automated guided vehicles.

11. A non-transitory computer readable storage medium storing computer instructions, wherein, the computer instructions when executed by a computer cause the computer to perform operations comprising:
obtaining a number of automated guided vehicles with shelf scanning devices;
determining, based on the number of the automated guided vehicles, a scanning area of a place to which each automated guided vehicle belongs;
determining, based on the scanning area, a scanning route of the scanning area to which each automated guided vehicle belongs;
transmitting the scanning route of the scanning area to which the automated guided vehicle belongs, to the automated guided vehicle, so that the automated guided vehicle starts scanning from an entry position of the scanning route of the scanning area to which the automated guided vehicle belongs and exits from an exit position of the scanning route of the scanning area to which the automated guided vehicle belongs; and
determining a position of a shelf in the scanning area to which the automated guided vehicle belongs based on scanning information of a shelf scanning device on the automated guided vehicle and position information of the automated guided vehicle.

12. The storage medium according to claim 11, wherein the operations comprise:
calculating a traveling route between an initial position and the entry position in response to determining that the initial position of the automated guided vehicle is not at the entry position of the scanning route of the scanning area to which the automated guided vehicle belongs; and
transmitting the traveling route to the automated guided vehicle so that the automated guided vehicle travels from the initial position to the entry position according to the traveling route.

13. The storage medium according to claim 11, wherein the determining the scanning area of the place, to which each automated guided vehicle belongs, comprises:
obtaining a distribution map of the place;
determining a distribution area of shelves in the distribution map based on the distribution map of the place;
evenly dividing the distribution area into at least two scanning areas, a number of the scanning areas being the same as the number of the automated guided vehicles; and
establishing a correspondence relation table between the scanning areas and the automated guided vehicles.

14. The storage medium according to claim 11, wherein the scanning information comprises a shelf number, and the position information of the automated guided vehicle comprises: coordinate point information of the place;
the determining the position of the shelf in the scanning area to which the automated guided vehicle belongs based on the scanning information of the shelf scanning device on the automated guided vehicle and the position information of the automated guided vehicle, comprises:
obtaining, in real time, the shelf number scanned by the shelf scanning device on the automated guided vehicle and the coordinate point information of the place where the automatic guiding vehicle travels, the coordinate point information corresponding to the shelf number; and
binding each shelf number to the obtained coordinate point information corresponding to each shelf number, to obtain the position of the shelf in the scanning area to which the automated guided vehicle belongs.

15. The storage medium according to claim 11, wherein the bottom of the automated guided vehicle is provided with a sweeper for reading a two-dimensional code of the place;
the determining the position of the shelf in the scanning area to which the automated guided vehicle belongs based on the scanning information of the shelf scanning device on the automated guided vehicle and the position information of the automated guided vehicle, comprises:
obtaining, in real time, a two-dimensional code of the shelf scanned by the shelf scanning device on the automated guided vehicle and the two-dimensional code of the place where the automated guided vehicle travels, the two-dimensional code of the place corresponding to the two-dimensional code of the shelf, wherein the two-dimensional code of the shelf is bound to the shelf number of the shelf, and the two-dimensional code of the place is bound to a position of a coordinate point of the place; and
obtaining the position of the shelf in the scanning area to which the automated guided vehicle belongs based on two-dimensional codes of shelves and the two-dimensional code of the place corresponding to the two-dimensional codes of shelves.

16. The storage medium according to claim 11, wherein the operations comprise:
comparing positions of shelves in each scanning area with preset correct positions of the shelves, to obtain a position of a shelf located in an incorrect position;
calculating, for the automated guided vehicle in the scanning area with the shelf located in the incorrect position, a return route between the exit position and the position of the shelf located in the incorrect position;
transmitting the return route to the automated guided vehicle so that the automated guided vehicle travels to the shelf located in the incorrect position according to the return route after reaching the exit position of the scanning route of the scanning area to which the automated guided vehicle belongs; and
after the automated guided vehicle reaches the position of the shelf located in the incorrect position, scanning the shelf located in the incorrect positions, and checking whether the scanned shelf is the shelf located in the incorrect position according to a scanning result.

17. The storage medium according to claim 16, wherein the automated guided vehicle is provided with a lifting platform;
the operations comprise:
calculating a conveyance route between the position of the shelf located in the incorrect position and a preset correct position of the shelf, and transmitting the conveyance route to the automated guided vehicle;
after the automated guided vehicle reaches the position of the shelf located in the incorrect position, controlling the lifting platform of the automated guided vehicle to reach a bottom of the shelf located in the incorrect position, so that the automated guided vehicle conveys the shelf located in the incorrect position to the preset correct position of the shelf according to the conveyance route.

* * * * *